United States Patent
Crary

(10) Patent No.: US 9,089,799 B2
(45) Date of Patent: Jul. 28, 2015

(54) FLUID DISTRIBUTION SYSTEM WITH FILTRATION

(75) Inventor: Lynwood F. Crary, Preston, CT (US)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 207 days.

(21) Appl. No.: 13/561,381

(22) Filed: Jul. 30, 2012

(65) Prior Publication Data

US 2013/0037116 A1    Feb. 14, 2013

Related U.S. Application Data

(60) Provisional application No. 61/521,109, filed on Aug. 8, 2011.

(51) Int. Cl.
| | |
|---|---|
| F16K 3/36 | (2006.01) |
| B01D 35/027 | (2006.01) |
| B01D 35/26 | (2006.01) |
| F01N 3/20 | (2006.01) |

(52) U.S. Cl.
CPC .............. *B01D 35/027* (2013.01); *B01D 35/26* (2013.01); *F01N 3/2066* (2013.01); *F01N 2610/10* (2013.01); *F01N 2610/1406* (2013.01); *F01N 2610/1426* (2013.01); *F01N 2610/1433* (2013.01); *F01N 2610/1473* (2013.01); *F01N 2610/1493* (2013.01); *Y02T 10/24* (2013.01)

(58) Field of Classification Search
CPC ................ B01D 35/027; F01N 3/2066; F01N 2610/1426; F01N 2610/1493
USPC ............... 137/239, 240, 544, 565.01, 565.11, 137/565.17, 565.34; 60/329, 453, 454; 417/32
See application file for complete search history.

(56) References Cited

U.S. PATENT DOCUMENTS

| | | | |
|---|---|---|---|
| 4,069,841 A | * | 1/1978 | Bartlett ..................... 137/565.34 |
| 5,560,342 A | | 10/1996 | Fournier et al. |
| 5,809,975 A | | 9/1998 | Tuckey et al. |
| 5,960,775 A | | 10/1999 | Tuckey |
| 6,068,672 A | | 5/2000 | Watson et al. |

(Continued)

FOREIGN PATENT DOCUMENTS

| | | |
|---|---|---|
| DE | 102006039882 B3 | 12/2007 |
| DE | 102007050272 A1 | 4/2009 |

(Continued)

OTHER PUBLICATIONS

European Search Report, Nov. 15, 2012 (5 pages).
EP Extended Search Report for EP Application No. 13182813.9 dated Jan. 19, 2015, (7 pages).

*Primary Examiner* — Jessica Cahill
(74) *Attorney, Agent, or Firm* — Reising Ethington P.C.

(57) ABSTRACT

A fluid distribution system may include a by-pass fluid filter that combines high volume, in-tank fluid filtration with low volume fluid delivery to an external device such as an SCR injector. One or more outlet ports located along the fluid filter housing can be configured to discharge fluid toward other fluid distribution system components. In systems such as SCR systems, where the liquid reducing agent may freeze when not in use, directing already thawed liquid toward other system components can help thaw the frozen reducing agent at desired locations first. The fluid distribution system can also be arranged so that flow through the filter is in the same direction during the distribution cycle and during the purge cycle.

14 Claims, 2 Drawing Sheets

(56) References Cited

U.S. PATENT DOCUMENTS

| | | |
|---|---|---|
| 6,213,726 B1 | 4/2001 | Tuckey |
| 6,877,522 B2 | 4/2005 | Dasilva et al. |
| 7,069,913 B1 | 7/2006 | Crary |
| 7,114,490 B2 * | 10/2006 | Zdroik .......................... 123/497 |
| 7,475,678 B2 | 1/2009 | Douyama et al. |
| 7,874,817 B2 | 1/2011 | Gettel et al. |
| 2009/0084736 A1 | 4/2009 | Rocheux et al. |
| 2010/0172763 A1 | 7/2010 | Habumuremyi |
| 2011/0147485 A1 | 6/2011 | Perruchot et al. |
| 2011/0297260 A1 * | 12/2011 | Mason .................... 137/565.29 |

| | | | |
|---|---|---|---|
| 2013/0000743 A1 | | 1/2013 | Crary |

FOREIGN PATENT DOCUMENTS

| | | | |
|---|---|---|---|
| DE | 102008010106 | * | 8/2009 |
| DE | 102009030261 A1 | | 5/2010 |
| EP | 2151559 A1 | * | 2/2010 |
| EP | 2182190 A2 | | 5/2010 |
| EP | 2295748 A1 | * | 3/2011 |
| EP | 2360359 A2 | * | 8/2011 |
| FR | 2764003 A1 | | 12/1998 |
| WO | WO 2008006840 A1 | * | 1/2008 |

* cited by examiner

250~
FLUID DISTRIBUTION SYSTEM WITH FILTRATION

This application claims the benefit of U.S. Provisional Application No. 61/521,109 filed Aug. 8, 2011, which is incorporated herein by reference in its entirety.

TECHNICAL FIELD

The present disclosure relates generally to the filtration of fluids in a selective catalytic reduction system.

BACKGROUND

Selective catalytic reduction (SCR) may be used to treat exhaust gases from combustion-type power plants such as internal combustion engines or other fuel burning devices to remove certain types of pollutants. For example, a reducing agent may be introduced into an exhaust gas stream in the presence of a catalyst to remove $NO_x$ compounds from the exhaust gases and replace them with gases such as water vapor, nitrogen, and/or carbon dioxide. Urea is one example of a reducing agent that may be used in an SCR system. SCR systems may be configured to deliver stored reducing agent to an injector or other delivery point located at an exhaust system component to disperse or insert the agent into the exhaust stream to be treated.

SUMMARY

In one implementation, a fluid distribution module includes a fluid pump having a pump inlet configured to receive liquid from an inner tank volume and a pump outlet fluidly connected to a module outlet port. The fluid distribution module further includes a fluid filter having an inlet side fluidly connected to the pump outlet, an outlet side including an outlet port for discharging fluid from the filter and into the tank volume, and a filter element disposed between the inlet and outlet sides of the fluid filter. The filter element is capable of removing contaminants from liquid that flows through the filter element.

In another implementation, a fluid distribution module includes a fluid pump capable of forward and reverse operation and having a pump inlet and a pump outlet. The pump outlet is fluidly connected to a module outlet port, and the pump inlet is configured to receive liquid from an inner tank volume during forward operation and to discharge liquid during reverse operation. The fluid distribution module further includes a fluid filter having an inlet side and an outlet side. The outlet side includes an outlet port for discharging fluid from the filter and into the tank volume. A filter element is disposed between the inlet and outlet sides of the filter and is capable of removing contaminants from liquid that flows through the filter element. The fluid distribution module further includes a purge line fluidly connecting the pump inlet to the inlet side of the filter and a valve operable to prevent fluid flow through the purge line during forward operation of the pump and operable to allow fluid flow through the purge line during reverse operation of the pump.

In another implementation, a method of operating a fluid distribution system, includes the steps of: circulating a liquid within a liquid storage tank along a circulation path from an inner tank volume to an inlet side of a fluid filter, through a filter element to an outlet side of the fluid filter, and back into the inner tank volume; and delivering some of the liquid from a location along the circulation path to a device outside of the storage tank that consumes the liquid. Said location along the circulation path is between the inner tank volume and the inlet side of the fluid filter.

DETAILED DESCRIPTION

As will become apparent from the following disclosure, various embodiments of SCR or other fluid handling systems and methods may offer one or more advantages over previously known systems and methods. It is noted that, except as otherwise described, the schematics in the figures are not meant to indicate actual component sizes or locations in the illustrated systems. They are meant only as examples of arrangements of SCR or fluid distribution system components that indicate how the different components may function together. Further, these and other embodiments of fluid distribution systems that can filter fluid for delivery to one or more desired distribution points are not limited to SCR systems, as other fluid handling systems may find these teachings advantageous.

Figure 1:
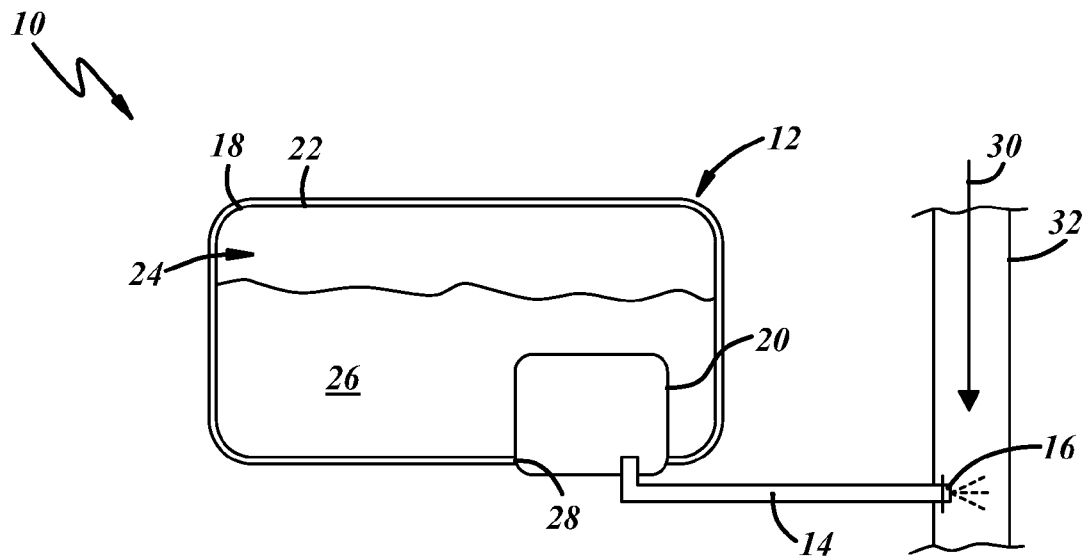
FIG. 1 is a schematic representation of an SCR system providing a reducing agent in an exhaust gas stream, according to one embodiment.

Referring now to FIG. 1, an example of an SCR system 10 is illustrated schematically and includes a fluid distribution system 12, a device supply line 14, and a device 16. In this embodiment, the distribution system 12 includes a storage tank 18 and a fluid distribution module 20. The storage tank 18 includes one or more walls 22 arranged to at least partially define an inner tank volume 24. Liquid fluid 26 is stored in the tank volume 24 with the remainder of the tank volume above the liquid being occupied by air or other gaseous fluid. Though referred to as fluid 26, the stored material may sometimes be at least partially solid, for example when fluid 26 freezes. The distribution module 20 is an assembly that distributes liquid to other SCR system components and/or within the distribution system 12. As shown in the embodiment of FIG. 1, the distribution module 20 may be attached to the storage tank 18, and at least a portion of the module 20 may extend through a module opening 28 formed through one or more walls of the storage tank 18. The distribution module 20 may be manufactured as a single, multi-component assembly to be easily installed in or over the module opening 28 in the tank and will be described in greater detail below.

The device supply line 14 fluidly connects the distribution system 12 to the device 16. The device 16 in this case is a liquid injector that receives fluid 26 from the storage tank 18 via the supply line 14. In other embodiments, the device 16 may be a simple nozzle, an atomizer, or any other type of device that receives fluid. In the example shown, doses of a reducing agent, included as part of the fluid 26, are delivered to and dispersed by the injector 16 into an exhaust gas stream 30 flowing through an exhaust conduit 32 from a combustion engine, for example. One example of a reducing agent for use in the SCR system 10 is urea, though other agents may be used. The urea may be in the form of an aqueous solution at any desired concentration, such as a concentration that minimizes the freezing point of the solution. As used herein, the term "reducing agent" generally refers to the liquid (or in some cases frozen) solution stored in the tank 18, in the context of SCR systems.

Figure 2:
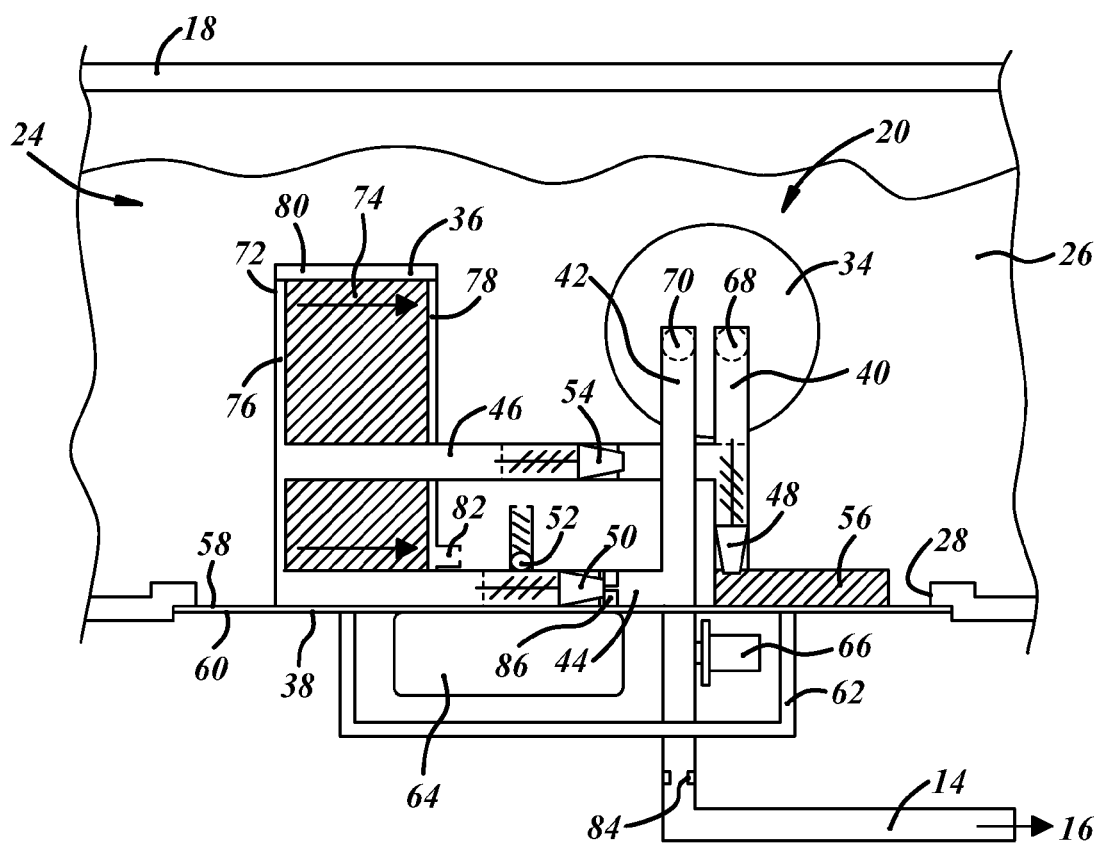
FIG. 2 is an enlarged view of a portion of FIG. 1, showing a fluid distribution module according to one embodiment.

Referring to FIG. 2, there is shown one implementation of the fluid distribution module 20. The illustrated module 20 is configured to be mounted at the bottom of the storage tank 18, but it may be mounted at the top of the tank 18 or elsewhere. As shown, at least a portion of the module 20 may be located within the storage tank volume 24, while other portions may be located outside the tank volume. The distribution module 20 may include a fluid pump 34 and a fluid filter 36 fluidly connected with each another and supported by a mounting flange 38. The module 20 may also include one or more fluid lines 40-46, valves 48-54, and a strainer 56, the operation of which is described in further detail below. Fluid lines 40-46 are shown schematically in FIG. 2 and are not limited to traditional tubular conduits or to the locations or positions shown. As used herein, the term "fluid line" refers to any component of the system through which fluid flows. For example, in addition to a fluid conduit, a fluid line may also be a hard connection between two ports through which a fluid may pass, a valve or valve body, a channel or hollow area in a component through which fluid may pass, etc. Additionally, while valves 48-54 shown in FIG. 2 are all one-way, pressure-actuated check valves, any type of valve and/or valve actuator may be used. In the illustrated embodiment, these components are all located on a tank side 58 of the flange 38. An opposite outer side 60 of the flange includes a housing 62 in which other module or system components may be located, such as a heater 64 and a sensor 66. The module 20 may of course include additional components not shown here, and one or more of the illustrated components may be omitted.

The fluid pump 34 draws fluid into a pump inlet 68 and discharges fluid from a pump outlet 70. The fluid pump 34 may be capable of forward and reverse operation, where fluid is discharged from the pump outlet 70 during forward operation and from the pump inlet 68 during reverse operation. The fluid pump 34 may be a positive displacement pump such as a gear pump, a gerotor pump, an impeller-type pump, or any other pump that causes fluid to flow into an inlet and out of an outlet. In one embodiment, the pump 34 is a gerotor pump and is capable of reversing the direction of fluid flow therethrough when an internal gear is turned in a reverse direction. Various methods of turning the internal gear of the pump may be used, including coupling any of a variety of electric motors therewith. Other types of reversible or non-reversible pumps may be used. In one embodiment, a brushless DC motor may be coupled with the fluid pump 34 via a magnetic coupling, but other motors and/or couplings may be employed. For example, a motor output shaft may be directly coupled to a pumping element such as a gear or impeller. The fluid pump 34 is capable of providing a fluid pressure and a fluid flow rate sufficient to operate the injector 16 and may be capable of providing a flow rate that is greater than that required to operate injector 16. For example, the fluid pump 34 may be capable of providing a volumetric or mass flow rate from about 2 to about 400 times the flow rate required by the injector 16, and may preferably be able to provide from about 20 to about 300 times the injector operational flow rate.

The fluid filter 36 is a component capable of removing contaminants from the fluid that flows through it. In one embodiment, the filter 36 is configured to remove solid particles of a certain size or larger from the fluid 26 as the fluid flows through it. In some fluid handling applications, other types of filters may be used to remove other types of contaminants such as unwanted chemicals from the fluid. As shown, the fluid filter 36 may be located within the tank volume 24, but may be located at least partially outside of the tank 18. The fluid filter 36 may include a housing 72, a filter element 74, and inlet and outlet sides 76 and 78. The filter element 74 is located in an internal volume of the housing 72 and may be positioned between the inlet and outlet sides 76, 78. The housing 72 may at least partially seal off the perimeter or other area of the filter element so that at least some of the fluid, and preferably all of the fluid, entering the inlet side 76 of the filter 36 must pass through the filter element 74 before being discharged at the outlet side 78 of the filter and into the tank volume 24. Inlet and outlet ports that provide access to the internal volume of the housing 72 may be provided. The filter housing 72 may also include various internal channels, baffles, and/or compartments to direct fluid flow therein to help optimize the available surface area of the filter element 74, for example, or to facilitate convenient arrangement of inlet and/or outlet ports for connection to other system components. The housing 72 may include a separate lid or top 80 as shown to enclose the filter element 74 in the housing and/or to form a seal at the top of the filter element. The housing 72 may be constructed in any shape or size to suit the particular application. In at least some implementations, the housing is shaped to at least partially surround one or more distribution module components.

In the illustrated embodiment, the inlet side 76 of the filter 36 is fluidly connected to the pump inlet 68 and the pump outlet 70 via various fluid lines and valves, and the outlet side 78 of the filter includes one or more circulation jets or outlet ports 82 through which filtered fluid may be discharged from the filter 36 and into the tank volume 24. The filter element 74 may be a liquid permeable component that allows liquid to flow through it, while trapping or otherwise preventing particles that are a certain size or larger from passing through it. Different types of filter elements 74 and filter media are known and may be constructed to have different amounts of total surface area and/or multiple layers of materials to affect the capacity of the fluid filter 36, among other filter characteristics.

The mounting flange 38 is a component that supports and/or provides an attachment location for one or more other module components, such as the fluid pump 34 or the fluid filter 36. The flange 38 may also serve as a cover or closure for the module opening 28 in the tank wall and may be attached at or near the edge of the opening as shown. Where the SCR system includes heater 64 on the outer side 60 of the flange 38, it may be preferable to construct the flange from a metal or other type of thermally conductive material (e.g., a thermally-conductive polymer-based material) so that thermal energy can be readily transferred through the thickness of the flange and into the tank volume 24 to help thaw any frozen fluid inside the tank.

Turning now to the particular arrangement of fluid lines, valves, and connections between components shown in FIG. 2, the fluid distribution module 20 includes an inlet line 40, an outlet line 42, a circulation line 44, and a purge line 46. The inlet line 40 connects the tank volume 24 to the pump inlet 68 so that fluid 26 can enter the fluid pump 34 during a distribution cycle—i.e., when the module 20 is operating to provide fluid to the injector 16 of the SCR system. An inlet check valve 48 may be provided in the inlet line 40 and may be operable to allow flow through the inlet line to the pump inlet 68 and to prevent flow from the inlet line into the tank volume 24. The strainer 56 may be attached to the inlet line 40 between the tank volume 24 and the inlet valve 48 to remove particles from the fluid before it is enters the pump 34. The outlet line 42 connects the pump outlet 70 to a module outlet port 84 so that the fluid 26 can exit the module 20 during the distribution cycle. In this embodiment, the outlet line 42 passes through openings in the flange 38 and the housing 62 and may have a connector or other type of end configuration suitable for attachment and/or detachment of the device supply line 14.

The circulation line 44 connects the pump outlet 70 to the fluid filter 36. More specifically, the illustrated circulation line 44 fluidly connects the outlet line 42 to the inlet side 76 of the filter 36. The circulation line 44 may be connected to the outlet line 42 anywhere between the pump outlet 70 and the outlet port 84 as shown. In another embodiment, the circulation line 44 may connect the fluid filter 36 to the supply line 14. The circulation line 44 can accommodate a flow rate of liquid from the fluid pump 34 that is in excess of that required to operate the injector of the SCR system. An optional flow restrictor 86 may be positioned in or along the circulation line 44 to limit the volumetric flow rate of fluid therethrough and thereby maintain a minimum fluid pressure in the device supply line 14 and/or at the injector 16. The flow restrictor 86 may include an aperture having a known size, or it may have a variable and/or controllable aperture size. Thus, at least a portion of the circulation line 44 may be described as a high-flow and low pressure branch off of outlet line 42.

A circulation valve 50 may be provided in the circulation line 44 and may be operable to allow flow through the circulation line to the fluid filter 36, such as during the distribution cycle or forward operation of the fluid pump 34. The circulation valve may also be operable and to prevent backflow through the circulation line 44 and the fluid filter 36, such as during the purge cycle or reverse operation of the fluid pump 34. The illustrated circulation valve 50 is a check valve that allows fluid flow in only one direct, away from the fluid pump 34 and toward the fluid filter 36. A relief valve 52 may also be provided in fluid communication with the inlet side 76 of the fluid filter 36. The illustrated relief valve 52 is operable to allow fluid flow out of the circulation line 44 and into the tank volume 24 and/or to prevent damage to the fluid filter 36 when the excess volumetric flow is too great for the fluid filter to accommodate all of the excess flow (e.g., when filter components are blocked by frozen material). The relief valve 52 may be positioned anywhere along the circulation line 44 or along the inlet side 76 of the filter 36 to relieve circulation line or filter pressure as necessary during the distribution cycle. In this example, the relief valve 52 is located between the check valve 50 and the fluid filter 36 so that it may also relieve line pressure as necessary when the filter 36 receives liquid from other sources, such as during a purge cycle as outlined below.

The purge line 46 is fluidly connected to the pump inlet 68 and is configured to return fluid from other parts of the SCR system back into the tank volume 24 during a purge cycle. In the illustrated embodiment, the purge line 46 connects the inlet line 40 to the filter 36 to perform this function. In particular, one end of the purge line 46 is connected to the inlet line 40 between the pump inlet 68 and the inlet check valve 48. The other end of the purge line 46 is connected to the inlet side 76 of the filter 36, in this embodiment. This arrangement can provide additional fluid filtration during the purge cycle, as will be described further. In another embodiment, the end of the purge line 46 opposite the pump inlet end may be located in the tank volume 24 so that purged fluid is discharged from the purge line directly to the tank volume without passing through the filter 36. The purge valve 54 may be provided in the purge line 46 and is operable to prevent fluid flow through the purge line when the fluid pump 34 is operated to pump fluid out of the pump outlet 70, such as during the distribution cycle or during forward operation of the fluid pump. The purge valve 54 is also operable to allow fluid flow through the purge line 46 when the fluid pump 34 is operated to pump fluid out of the pump inlet 68, such as during the purge cycle. The illustrated purge valve 54 is a purge check valve that allows fluid flow in only one direction, away from the fluid pump 34 and toward the fluid filter 36.

The housing 62 may be useful to enclose various components, such as the heater 64 and sensor 66, within the module 20 while isolating them from the environment inside the tank 18 and outside the housing. The heater 64 can be any type of heat source that can deliver thermal energy to the tank volume. The heater 64 may be located in the housing as shown or anywhere else in the system, and multiple heaters may be employed. The sensor 66 may be any type of sensor that can monitor one or more system conditions or variables in or around the module. In one embodiment, the sensor 66 is a pressure sensor that can monitor the fluid pressure in the outlet line 42 and/or the device supply line 14. The sensor 66 could also be a temperature sensor, fluid quality sensor, flow rate sensor, or other type of sensor, and more than one sensor may be provided.

Operation of a system that includes the fluid distribution module 20 can be described in terms of a distribution cycle and a purge cycle. A distribution cycle occurs during normal operation of the SCR system wherein a reducing agent is delivered from the storage tank 18 to the exhaust gas stream to be treated. In cold weather, some or all of the reducing agent in the system may be frozen at the beginning of a distribution cycle due to system inactivity. A heater, such as heater 64 of FIG. 2, may be energized at the beginning of a distribution cycle under such conditions prior to the fluid pump 34 being energized. After heating for a given duration or after a certain amount of reducing agent has been thawed, the fluid pump 34 may be energized so that it draws liquid 26 from the tank volume 24, through the strainer 56, through the inlet line 40, through the open inlet valve 48, and into the pump inlet 68. The purge valve 54 is closed during the distribution cycle due to its connection at the lower pressure inlet side of the pump and its orientation with respect to the pressurized filter 36.

Fluid drawn into the pump 34 from the tank volume exits the pump via the pump outlet 70 and pressurizes the outlet line 42, the device supply line 14, and the circulation line 44. The circulation line 44 and/or the flow restrictor 86 are sized to allow a particular volumetric rate of fluid flow therethrough, which may be up to two orders of magnitude or more higher than the volumetric rate of fluid flow through the supply line 14. Fluid flows through the circulation line 44 and the open circulation valve 50 to reach the inlet side 76 of the filter 36, where it continues to flow through the filter element 74 to the outlet side 78 of the filter. Fluid further continues through the circulation jet 82 and into the tank volume 24, where it may again be drawn into the pump 34 for recirculation and additional filtering. The circulation jet 82 may be located at or near the bottom of the filter housing 72 or otherwise located to direct liquid fluid flow toward other module components, where the already thawed and circulated reducing agent being expelled from jet 82 may be useful to help continue the thawing process and ensure a supply of liquid reducing agent for the pump to draw from the tank volume. This type of jet placement combined with the high volumetric flow rate of fluid through the filter may facilitate faster melting of frozen reducing agent.

The fluid filter 36 as arranged in the example of FIG. 2 may be considered a by-pass or parallel filter that continually filters the fluid 26 within the tank volume 24 during a distribution cycle before the fluid ever reaches the device supply line 14. The volumetric flow capacity of the pump 34 relative to the volume of the stored liquid 26 may be such that the entire volume of the stored liquid can be filtered multiple times per hour during a distribution cycle when the liquid is not frozen. This arrangement and others like it may quickly and effectively filter the entire volume of reducing agent or other stored liquid after the tank 18 is filled, possibly eliminating the need for an in-line filter of any size. In one embodiment, the pump outlet is fluidly connected to an injector without an in-line fluid filter between the pump outlet and the injector. Of course, in other embodiments, a low-capacity filter (not shown) may be included in-line with the supply line 14, the inlet line 40, or the outlet line 42. Such an auxiliary low capacity filter may be used to filter any initial small amount of liquid that finds its way into the supply line 14 after a refill of tank 18 and before passing through filter 36, but may be unnecessary. For example, the distribution module 20 could be energized with the device 16 in a closed position for any period of time so that the liquid in the tank is continually filtered even when the device 16 is not in use.

Elimination or size-reduction of any filter in-line with the supply line 14 may help the system to provide reducing agent to the injector or other delivery point more quickly on system start up due to the absence or reduction of additional frozen material that may otherwise be present in the in-line filter and that would require thawing to allow fluid to reach the injector. Such in-line filter thawing may be exceptionally slow where the filter is located in a low flow rate portion of the system. Additionally, locating the filter 36 within the tank volume 24 in a by-pass arrangement as shown can provide in-tank liquid circulation that may accelerate thawing of frozen material in the tank and/or near other module 20 components.

Additional advantages may be realized by the use of a by-pass filter in the fluid distribution system during a purge cycle as noted below. The purge cycle may be initiated after the distribution cycle ends and before system shutdown. During the purge cycle, the fluid pump 34 may be operated in reverse to draw fluid from system lines and discharge the fluid into the tank volume 24 so that the liquid is not allowed to freeze while in the system lines and/or other system components, particularly in those lines and/or other components outside of the tank 18. Referring again to FIG. 2, fluid flow through the fluid pump 34 during the purge cycle is such that the pump outlet 70 becomes the low pressure side of the pump and the pump inlet 68 becomes the high pressure side of the pump. Fluid is drawn from the supply line 14, through the outlet line 42, and into the pump outlet 70. Air or other gas from the exhaust conduit is allowed to enter the device end of the supply line 14 by placing the injector in an open condition, for example, to prevent a vacuum from forming in the supply line 14. This may be accomplished by other means, such as opening a valve located near the injector. The circulation valve 50 remains closed during the purge cycle so that no backflow of fluid is allowed through the fluid filter 36. The fluid flow continues from the fluid pump 34, out of the pump inlet 68, and into the inlet line 40. The inlet line 40 is closed-off by inlet valve 48, and all of the fluid purged from the system lines continues through the purge line 46, through the open purge valve 54, to the inlet side 76 of the filter 36, through the filter element 74, and into the tank volume 24 through the outlet port 82. The purge cycle may continue for some period of time even after all of the liquid fluid has been expelled from the module to allow gaseous fluid to flow through the system, including through the filter 36 where it may be useful to remove liquid absorbed in the filter element 74.

Arranged as shown and described, the filter 36 is not subjected to backflow of fluids during the distribution or purge cycles. Thus, particles captured by the filter element are not directly washed back into the tank volume 24. That is, in the implementation discussed above, fluid flow through the filter 36 is always in the same direction during the distribution and purge cycles, as indicated by the arrows in FIG. 2, so that fluid filtration is provided even during the purge cycle. Stated differently, fluid flows through the filter element 74 from the inlet side 76 of the filter 36 to the outlet side 78 of the filter when the fluid pump 34 is operated to pump fluid out of the pump outlet 70 and when the fluid pump is operated to pump fluid out of the pump inlet 68.

Including the fluid filter 36 along the low pressure circulation line 44 rather than the higher pressure device supply line 14 may make it unnecessary to utilize pump flow to compress the air within the filter housing during system start-up, and may also allow the use of larger system filters. For example, locating the fluid filter 36 along a low pressure portion of the system as described can allow filter components, such as the filter housing, to be designed with larger surfaces areas while being subjected to the same forces or internal loads as smaller filter components located in a high pressure portion of the system.

Figure 3:
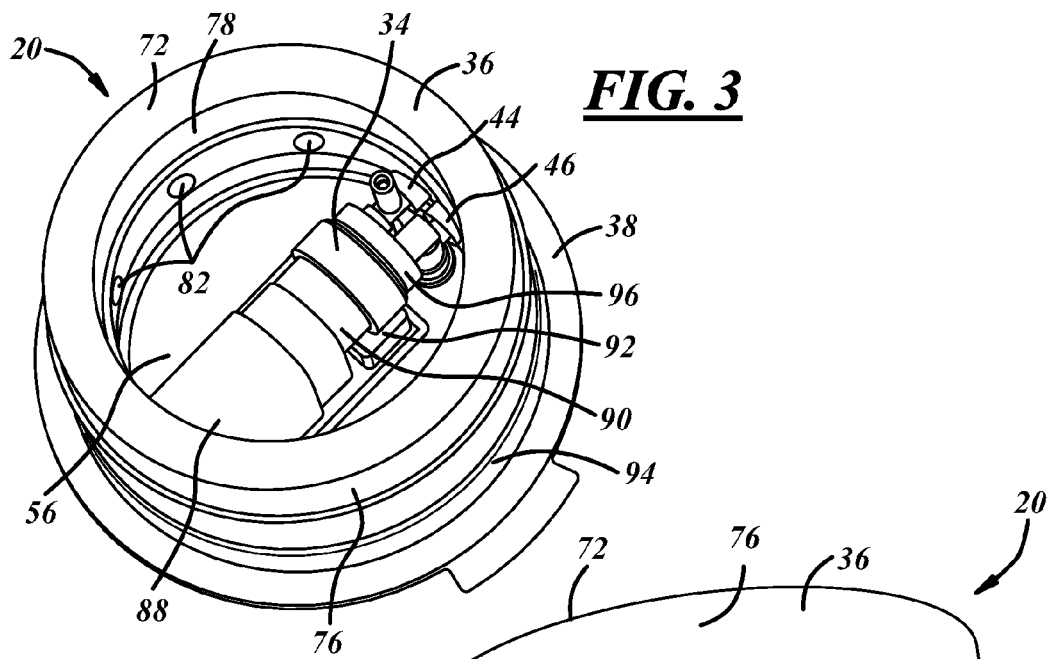
FIG. 3 is a top perspective view of a fluid distribution module including an annular fluid filter, according to one embodiment.
Figure 4:
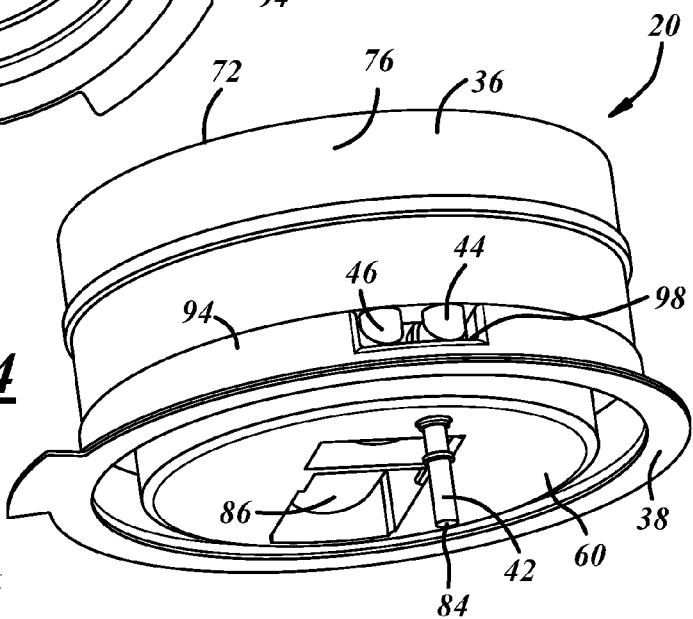
FIG. 4 is a perspective view of a side and bottom of the fluid distribution module of FIG. 3.
Figure 5:
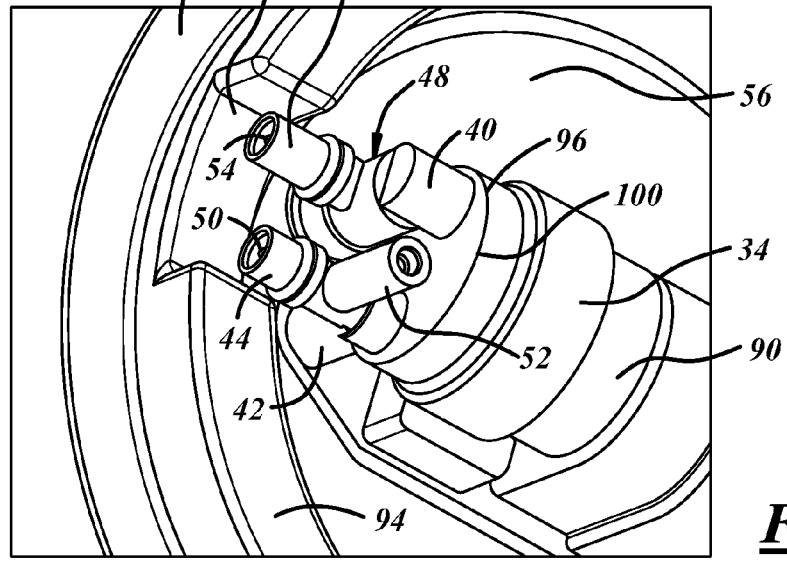
FIG. 5 is an enlarged view of a portion of FIG. 3, with the fluid filter removed.

FIGS. 3-5 show various components of an illustrative fluid distribution module 20, demonstrating one example of a physical arrangement of the components that are depicted schematically in FIG. 2. A top view of the fluid distribution module 20 is shown in FIG. 3. Visible in this view are some earlier-described components, such as the fluid pump 34, the fluid filter 36, the mounting flange 38, and the strainer 56. In this example, the fluid filter 36 is annular or ring-shaped and surrounds the other components of the module 20 on the tank side of the flange 38. A filter so shaped can also function as a "swirl-pot" where a reservoir of melted reducing agent is continually circulated through and expelled from the filter at one or more circulation jet locations 82 surrounding the pump 34 to speed melting of frozen reducing agent near the pump inlet line 40 or strainer 56. This can help prevent possible starving of the pump that could occur if melted fluid was expelled from the filter in a direction away from the other module components and toward tank side walls for example. Similar results may be achieved with the fluid filter shaped to only partially surround the other module components. Maintaining such a reservoir of liquid reducing agent near the fluid pump 34 also may help prevent starving of the pump during vehicle maneuvers that would otherwise cause the liquid fluid in the tank to shift away from the module 20.

The illustrated fluid filter 36 includes an annular housing 72, and the filter element is disposed therein. The inlet side 76 of the filter 36 is at the outer diameter or perimeter of the housing 72, and the outlet side 78 of the filter is at the inner diameter or inner wall of the housing. A plurality of circulation jets or outlet ports 82 is shown on the outlet side 78 of the filter 36 near the bottom of the housing 72 (i.e., the end of the housing nearest the mounting flange 38). The outlet ports 82 may be located, configured and/or shaped to direct fluid flow in any direction. For example, one or more outlet port 82 may be configured to direct discharged fluid toward one or more other distribution module component(s), such as the fluid pump, fluid lines or valves. In at least some implementations, not all of the outlet ports 82 point directly toward the center of the module 20. One or more of the ports 82 may point slightly upward, downward, or sideways to achieve a desired fluid flow pattern around other module components, to guide liquid directly toward particular portions of the tank volume, or for other reasons. One or more outlet ports 82 may be located at the outer diameter of the housing 72 where internal flow paths are formed in the housing 72 to so-direct fluid flow from the outlet side of the filter. In other words, the inlet and outlet sides of the filter do not necessarily refer to physically opposite sides of the filter housing. As shown, the mounting flange 38 may include support features such as features 92, 94 formed therein for supporting the pump 34 and the filter 36, respectively, in their desired positions. Also shown in FIG. 3 is a valve manifold 96 attached to the fluid pump 34 that can house various fluid lines and/or valves as described below.

FIG. 4 is a bottom view of the fluid distribution module 20 of FIG. 3. The housing 62 of FIG. 2 and components housed therein are omitted in this view. A portion of the outlet line 42 is shown with outlet port 84 at its end. The outlet line 42 is configured for attachment to a device supply line to allow fluid to flow from the module 20 to the injector. Also shown in FIG. 4 are fluid connections at the inlet side 76 of the fluid filter 36. In particular, the circulation line 44 and the purge line 46 are connected to the inlet side 76 of the fluid filter 36, which in this case is along the bottom of the filter housing 72. Portions of the circulation and purge lines 44, 46 extend from the pump 34 (shown in FIG. 3), located inside the inner diameter of the annular filter housing 72, to the outside diameter of the housing through an opening formed between recess 98 and the bottom of the housing. The recess 98 is formed in the filter support feature 94 of the flange 38 to accommodate those portions of lines 44, 46. In addition to accommodating lines 44, 46, the opening formed by the recess 98 provides a fluid flow path between the outer diameter and the inner diameter of the annular filter 36 and across the support feature 94. This fluid flow path can allow liquid from other areas of the storage tank into the interior (i.e., outlet side 78, in this example) of the ring-shaped filter housing 72 so that any reservoir of liquid formed there is never completely depleted when the reducing agent is thawed. Additional recesses or openings may be formed in the flange 38, in the housing 72, or in other components to allow a limited amount of liquid fluid to pass from one side of the filter housing to the other.

In this example, the fluid pump is operated by a motor 86 located beneath or at least partially disposed in a housing 88 formed in the flange 38. The motor 86 may thus be located outside of the tank volume on the outer side of the flange 38 when the module 20 is installed in a storage tank. The motor 86 may be magnetically coupled to the fluid pump via adjacent coupling components, where one coupling component (not shown) is attached to the motor and the other coupling component (component 90 of FIG. 3) is attached to the fluid pump 34. One of the coupling components may include magnetic material, and the other may include magnetic and/or ferromagnetic material so that the coupling components rotate about a longitudinal axis in unison, thereby transferring rotational motion of the motor to the appropriate pump component to cause the pump to operate.

FIG. 5 is an enlarged top view of a portion of the module 20 of FIG. 3 showing the manifold 96 in greater detail. The manifold 96 may embody at least a portion of one or more of the above-described fluid lines and/or valves. In this view, the fluid filter has been omitted for clarity, and some other components such as the fluid pump 34, the strainer 56, and the support feature 94 are labeled for context. The manifold 96 may be attached to a face of the fluid pump 34 opposite the coupling component 90 so that it covers the pump inlet and the pump outlet. Between a manifold housing 100 and the pump face, the pump inlet is fluidly connected to the inlet line 40, and the pump outlet is fluidly and separately connected to the outlet line 42. The inlet line 40 draws fluid through the strainer 56 and into the pump 34. The inlet line 40 has inlet valve 48 installed therein so that fluid flows through the purge line 46 and the purge valve 54 during the purge cycle. The circulation line 44 branches from the outlet line 42 and has the circulation valve 50 disposed therein to prevent the fluid flow from bypassing the filter and flowing directly from the purge line 46 to the outlet line 42 during the purge cycle. The manifold 96 also houses the relief valve 52. The manifold 96 may conveniently house all of the aforementioned valves and provide system fluid lines and/or ports all grouped together in a compact unit. This efficient packaging of module components can allow for directed heating during system start-up. For example, a single, relatively powerful heat source may be located near the manifold 96 to thaw multiple module components such as valves, fluid pump ports, and filter housing ports simultaneously instead of multiple, less powerful heat sources being separately located to thaw various components in different areas of the distribution module.

In accordance with one or more of the above-described arrangements, illustrative methods of operating a fluid distribution system can also be described. In one embodiment, the method may include providing a fluid pump that is capable of providing a fluid flow rate (e.g., mass flow rate or volumetric flow rate) that is greater than the fluid flow rate required by the injector or other device, operating the pump so that the flow rate of liquid from the pump is greater than that required by the injector, delivering the required flow rate of liquid to the injector, and delivering or diverting excess liquid flow from the pump to the fluid filter. In this manner, the fluid pump may be operated at its maximum capability even if the injector does not use all of the fluid being discharged from the pump, and some benefit may be realized because the excess fluid is filtered or cleaned. Including a filter in the system to utilize excess fluid pump capacity can offer system designers or manufacturers the option of specifying larger fluid pumps that may tend to have increased durability, run cooler, or provide more consistent fluid delivery when compared to smaller pumps. For example, some injectors or other devices may only require a volumetric flow of liquid of about 1 liter/hr or less and often as low as 5-10% of that. Manufacturing liquid fluid pumps that can deliver such small amounts of liquid per unit time, especially at pressures that may be in excess of 5 bar and/or in applications such as SCR systems where empty supply lines may often require refilling, may be difficult or impractical.

According to another embodiment, a method of operating a fluid distribution system may include circulating a liquid within the liquid storage tank along a circulation path. The circulation path continues from the tank volume to the inlet side of the fluid filter, through the filter element to the outlet side of the filter, and back into the tank volume. This method may further include delivering some of the liquid from a location along the circulation to a device outside of the storage tank that consumes the liquid, such as the above-described injector. The location along the circulation path from which the fluid is delivered to the device may be between the inner tank volume and the inlet side of the fluid filter. As noted above, the volumetric or mass flow rate of liquid through the filter and along the circulation path may be significantly higher than the flow rate to the outside device. In one embodiment, the flow rate of liquid along the circulation path is at least double the flow rate of liquid to the device, but may be even higher depending on the capacity of the fluid pump as described above.

The method may further include distribution and purge cycles. For example, the distribution cycle can include operating the fluid pump in the forward direction while circulating the liquid in the tank. Subsequently, the purge cycle may include operating the fluid pump in the reverse direction to purge the fluid supply line through which the fluid is delivered to the device. Using a fluid distribution system such as those described above, the purged fluid can be directed to the inlet side of the fluid filter so that the purged fluid passes through the filter element in the same direction as it does during the distribution cycle.

Various circulation paths will be apparent from one or more embodiments of the fluid distribution structures described herein. One example includes a path that starts in the tank volume and continues through the following components to reach the tank volume again: a strainer, an inlet line, an inlet valve, a pump inlet of a pump, a pump outlet of the pump, an outlet line, a circulation line, a circulation valve, an inlet side of a filter, a filter element, an outlet side of the filter, and an outlet port. Of course, other components may be included along the circulation path and/or one or more components may be omitted in some cases. Illustrative locations along the circulation path between the tank volume and the inlet side of the fluid filter may include the pump outlet or the outlet line of the system. However, the location within the system from which liquid is delivered to the injector or some other location outside of the storage tank is not so limited. For example, the tank volume itself may be part of the circulation path as described, and fluid may be delivered directly from the tank volume to the location outside of the tank using a secondary fluid pump to practice the method. In that case, the system may include an in-tank filter powered by a dedicated pump that continually filters the fluid in the tank so that the fluid delivered to the outside of the tank by a different pump requires little or no additional filtration.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fluid distribution module, comprising:
    a fluid pump having a pump inlet configured to receive liquid from an inner tank volume and a pump outlet fluidly connected to a module outlet port;
    the fluid pump is capable of forward operation receiving liquid through the pump inlet and discharging liquid from the pump outlet through the module outlet port and reverse operation receiving fluid through the pump outlet and discharging fluid through the pump inlet; and
    a fluid filter having an inlet side fluidly connected to the pump inlet and pump outlet, an outlet side having an outlet port for discharging fluid from the filter and into the tank volume, and a filter element disposed between the inlet and outlet sides of the fluid filter capable of removing contaminants from liquid that flows through the filter element and liquid flows through the filter element in the same direction during both forward and reverse operation of the fluid pump.

2. The fluid distribution module of claim 1, wherein the outlet port is configured to direct discharged fluid toward one or more other distribution module component(s).

3. The fluid distribution module of claim 1, wherein the fluid filter comprises a housing that at least partially surrounds one or more other distribution module component(s) and the filter element is disposed in the housing.

4. The fluid distribution module of claim 1, wherein the fluid pump is capable of providing a flow rate that is from about 2 to about 400 times a flow rate required to operate a device to be connected to the module outlet port.

5. The fluid distribution module of claim 1, further comprising:
    a purge line fluidly connected to the pump inlet; and
    a valve disposed in the purge line that is operable to prevent fluid flow through the purge line when the fluid pump is operated to pump fluid out of the pump outlet and operable to allow fluid flow through the purge line when the fluid pump is operated to pump fluid out of the pump inlet.

6. The fluid distribution module of claim 5, wherein the purge line fluidly connects the pump inlet to the inlet side of the fluid filter so that fluid flows through the filter element from the inlet side of the filter to the outlet side of the filter when the fluid pump is operated to pump fluid out of the pump outlet and when the fluid pump is operated to pump fluid out of the pump inlet.

7. A fluid distribution module, comprising:
    a fluid pump capable of forward and reverse operation and having a pump inlet and a pump outlet, the pump outlet being fluidly connected to a module outlet port, wherein the pump inlet is configured to receive liquid from an inner tank volume during forward operation and to discharge liquid during reverse operation;
    a fluid filter having an inlet side and an outlet side, the outlet side including an outlet port for discharging fluid from the filter and into the tank volume, and a filter element disposed between the inlet and outlet sides of the filter capable of removing contaminants from liquid that flows through the filter element;
    a purge line fluidly connecting the pump inlet to the inlet side of the filter;
    a valve operable to prevent fluid flow through the purge line during forward operation of the pump and operable to allow fluid flow through the purge line during reverse operation of the pump; and
    liquid flows through the filter element in the same direction during both forward and reverse operation of the fluid pump.

8. The fluid distribution module of claim 7, further comprising:
    a relief valve in fluid communication with the inlet side of the fluid filter.

9. The fluid distribution module of claim 7, wherein the fluid filter comprises a housing that at least partially surrounds one or more other distribution module component(s), the filter element being disposed in the housing and the outlet port being located along the housing so that discharged fluid is directed toward said component(s).

10. The fluid distribution module of claim 7 wherein in forward operation the fluid pump provides a flow rate of liquid through the fluid filter which is at least double the flow rate of liquid through the module outlet port.

11. The fluid distribution module of claim 7 wherein the outlet port of the fluid filter discharges fluid in a direction generally toward the fluid pump.

12. The fluid distribution module of claim 7 further comprising a plurality of outlet ports arranged around the fluid pump and through which liquid is discharged onto the fluid pump.

13. The fluid distribution module of claim 7, further comprising:
    a circulation line fluidly connecting the pump outlet to the inlet side of the filter; and
    a valve operable to prevent fluid flow through the circulation line during reverse operation of the fluid pump and operable to allow fluid flow through the circulation line during forward operation of the fluid pump.

14. The fluid distribution module of claim 13, further comprising:
a valve manifold that houses both of said valves.

* * * * *